US009638473B2

(12) United States Patent
Rasmussen et al.

(10) Patent No.: US 9,638,473 B2
(45) Date of Patent: May 2, 2017

(54) BEVERAGE DISPENSING ASSEMBLY COMPRISING BEVERAGE DISTRIBUTION PYTHON AND A METHOD OF PRODUCING THE BEVERAGE DISTRIBUTION PYTHON

(71) Applicant: CARLSBERG BREWERIES A/S, Copenhagen V (DK)

(72) Inventors: Jan Nørager Rasmussen, Olstykke (DK); Steen Vesborg, Gentofte (DK)

(73) Assignee: CARLSBERG BREWERIES A/S, Copenhagen V (DK)

( * ) Notice: Subject to any disclaimer, the term of this patent is extended or adjusted under 35 U.S.C. 154(b) by 62 days.

(21) Appl. No.: 14/649,182

(22) PCT Filed: Dec. 4, 2013

(86) PCT No.: PCT/EP2013/075532
§ 371 (c)(1),
(2) Date: Jun. 2, 2015

(87) PCT Pub. No.: WO2014/086858
PCT Pub. Date: Jun. 12, 2014

(65) Prior Publication Data
US 2015/0308755 A1     Oct. 29, 2015

(30) Foreign Application Priority Data

Dec. 4, 2012   (EP) ..................................... 12195517

(51) Int. Cl.
*B67D 7/74*     (2010.01)
*F28F 1/10*     (2006.01)
(Continued)

(52) U.S. Cl.
CPC ................ *F28F 1/10* (2013.01); *B23P 15/26* (2013.01); *B67D 1/0865* (2013.01); *F16L 11/22* (2013.01);
(Continued)

(58) Field of Classification Search
CPC .......... B67D 1/0865; F28F 1/00; B23P 15/26; F28D 7/0008; F16L 11/22; F16L 53/00; F16L 59/153
(Continued)

(56) References Cited

U.S. PATENT DOCUMENTS 3,269,422 A * 8/1966 Matthews ............ B67D 1/0867
138/111
5,094,088 A * 3/1992 Davis ...................... B67D 7/80
165/164
(Continued)

FOREIGN PATENT DOCUMENTS

EP     0382310     8/1990
EP     1626221     2/2006
(Continued)

OTHER PUBLICATIONS

International Search Report on corresponding PCT application (PCT/EP2013/075532) from International Searching Authority (EPO) dated Aug. 26, 2014.

*Primary Examiner* — Lien Ngo
(74) *Attorney, Agent, or Firm* — Klein, O'Neill & Singh, LLP

(57) ABSTRACT

A beverage dispensing assembly 10 comprises a beverage distribution python 18 extending between a beverage storage area and a beverage tapping area. The beverage distribution python 18 comprises a liquid carrying line defining a center line 22. The liquid carrying line comprises a beverage tube 16 and/or a beverage guide tube. The beverage distribution python 18 further comprises a pipe 34 covering the liquid carrying line in a coaxial relationship to the center line and establishing a space in-between the pipe 34 and the liquid carrying line. An insulation layer 32 comprises at least 80% aerogel by volume is located in the space between the pipe
(Continued)

34 and the liquid carrying line and encircles the liquid carrying line.

18 Claims, 7 Drawing Sheets

(51) Int. Cl.
| | | |
|---|---|---|
| *B67D 1/08* | (2006.01) | |
| *F16L 59/153* | (2006.01) | |
| *F16L 11/22* | (2006.01) | |
| *F28D 7/00* | (2006.01) | |
| *F16L 53/00* | (2006.01) | |
| *B23P 15/26* | (2006.01) | |

(52) U.S. Cl.
CPC ............. *F16L 53/00* (2013.01); *F16L 59/153* (2013.01); *F28D 7/0008* (2013.01); *F28F 2270/00* (2013.01)

(58) Field of Classification Search
USPC .................. 222/129, 246.6, 399; 62/389–399
See application file for complete search history.

(56) References Cited

U.S. PATENT DOCUMENTS

| | | | | |
|---|---|---|---|---|
| 5,115,103 | A * | 5/1992 | Yamanishi | C08J 9/32 174/101.5 |
| 5,409,683 | A | 4/1995 | Tillotson et al. | |
| 5,725,028 | A * | 3/1998 | Cleland | F16L 9/20 138/111 |
| 6,058,979 | A * | 5/2000 | Watkins | B29C 70/66 138/114 |
| 7,516,623 | B2 * | 4/2009 | Hall, Sr. | B67D 1/0867 62/297 |
| 7,854,241 | B2 | 12/2010 | Chenin et al. | |
| 2002/0094426 | A1 | 7/2002 | Stepanian et al. | |
| 2005/0046086 | A1 | 3/2005 | Lee et al. | |
| 2005/0047871 | A1 | 3/2005 | Lee et al. | |
| 2005/0100728 | A1 | 5/2005 | Ristic-Lehmann et al. | |
| 2005/0192367 | A1 | 9/2005 | Ou et al. | |
| 2006/0137383 | A1 * | 6/2006 | Chiusolo | B67D 1/0406 62/390 |
| 2006/0207673 | A1 * | 9/2006 | O'Brien | F16L 59/065 138/114 |
| 2007/0014979 | A1 * | 1/2007 | Bullock | B32B 5/245 428/292.1 |
| 2007/0272902 | A1 * | 11/2007 | Evans | C09K 21/12 252/600 |
| 2008/0121304 | A1 * | 5/2008 | Carlier | F16L 59/028 138/149 |
| 2009/0301596 | A1 | 12/2009 | Van Oosten | |
| 2010/0154916 | A1 | 6/2010 | Jackson et al. | |
| 2010/0288758 | A1 | 11/2010 | Blain | |
| 2010/0320351 | A1 | 12/2010 | Jeffery | |
| 2011/0072979 | A1 | 3/2011 | Fogg, IV | |
| 2012/0267070 | A1 * | 10/2012 | Mack | F28D 7/0041 165/104.11 |

FOREIGN PATENT DOCUMENTS

| | | |
|---|---|---|
| EP | 2386811 | 11/2011 |
| EP | 2422950 | 2/2012 |
| EP | 2415577 | 2/2015 |
| GB | 2166833 | 5/1986 |
| GB | 2323653 | 9/1998 |
| GB | 2459560 | 11/2009 |
| WO | WO2005/068361 | 7/2005 |
| WO | WO2008/011423 | 1/2008 |
| WO | WO2009/133346 | 11/2009 |
| WO | WO 2009/134992 A2 * | 11/2009 |
| WO | WO2010/080238 | 7/2010 |
| WO | WO2011/066209 | 6/2011 |

* cited by examiner

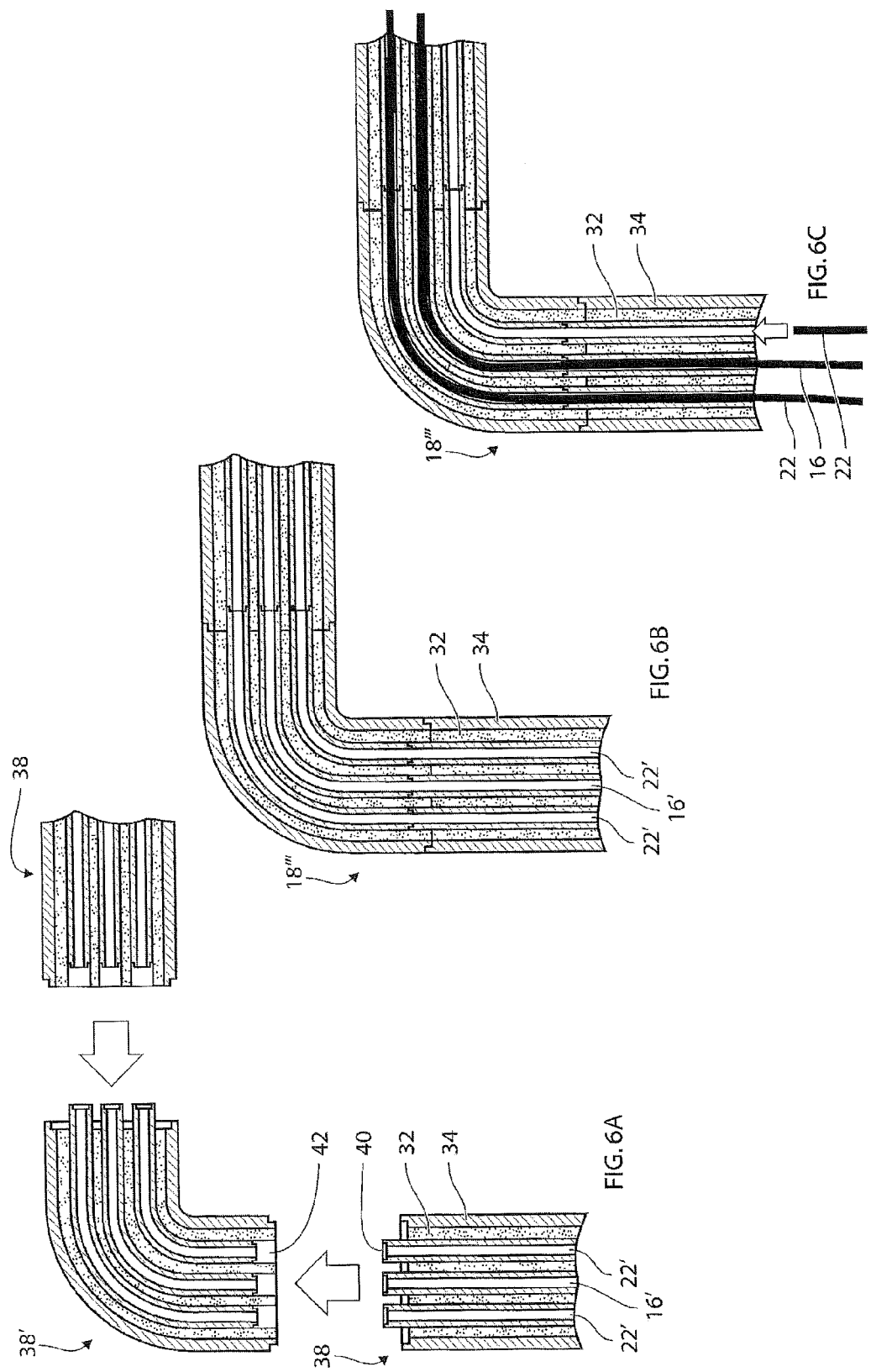

BEVERAGE DISPENSING ASSEMBLY COMPRISING BEVERAGE DISTRIBUTION PYTHON AND A METHOD OF PRODUCING THE BEVERAGE DISTRIBUTION PYTHON

CROSS-REFERENCE TO RELATED APPLICATIONS

This application is the national phase entry, under 35 U.S.C. Section 371(c), of International Application No. PCT/EP2013/075532, filed Dec. 4, 2013, claiming priority from European Application No. 12195517.3, filed Dec. 4, 2012. The disclosures of the International Application and the European Application from which this application claims priority are incorporated herein by reference in their entireties.

FEDERALLY SPONSORED RESEARCH OR DEVELOPMENT

Not Applicable

BACKGROUND

The present invention relates to a python for a beverage dispensing system and a method for producing the python.

DESCRIPTION OF THE RELATED ART

Pythons are known in the beverage dispensing systems as a set of beverage lines or tubes which interconnect a number of beverage containers and a number of beverage taps. The beverage containers are typically located in a cool storage room, such as a basement or the like, in order to ensure that the beverage stays at an optimal storage and/or drinking temperature which is typically significantly lower than the comfortable indoor temperature. The beverage taps are typically located on a stanchion in a bar which is located in an area having room temperature, i.e. about 21° C. Thus, the beverage to be dispensed at the beverage tap must be transported from the beverage container located in the cool storage room to the tap located in room temperature via the python.

In order for the beverage to remain cool within the python, the python may include not only beverage lines but also cooling lines which circulate a cooling liquid adjacent the beverage lines. In this way the beverage lines within the python will remain cool due to convective cooling. The cooling lines may be communicating with a compressor and a heat exchanger in order to keep the cooling liquid at a temperature which is equal to or lower than the optimal drinking temperature of the beverage. Further, in order to minimize the heat ingression into the beverage- and cooling lines and thereby minimizing power input to the compressor, the python is typically enclosed by insulation material.

However, using conventional insulation materials such as polymeric foam insulation, the heat ingression into the beverage- and cooling lines still typically amount to between 8-10 W/m. Taking account of the thermal losses of the heat exchanger and cooling lines together with the thermal and electrical losses of the compressor, the electrical input power of the compressor will amount to approximately 30-40 W/m.

Since the applicant company Carlsberg Breweries A/S alone has installed over 100.000 beverage dispensing pythons, the total electrical wattage used by those pythons only will amount to 20 MW electrical power, corresponding to about 2% of a typical major power plant.

Examples of prior art pythons are described in EP 1 626 221, and GB 2 166 833 A which both relate to a python having a foam insulation. However, foam insulation does not give an optimal insulation unless a very thick insulation layer is used. However, there is a need for keeping the overall thickness of the python to a minimum.

New insulation materials such as aerogels do provide improved insulation capabilities compared to foam insulation. Some prior art disclose different aerogel products. EP 2 386 811 A2 discloses a refrigerated container.

Aerogels are typically rigid and brittle. It would be an advantage to provide flexible aerogels which could adapt to different shapes. US 2002/0094426, EP 2 422 950 A2, EP 2 415 577 A2 A1 and US 2005/0046086 all describe methods for producing flexible mats of aerogel.

Aerogels may according to EP 382 310 be produced under supercritical fluid conditions by following the following operating steps:

(a) the relevant metal alkoxide(s) is/are mixed with water in the presence of a catalyst of acidic character;
(b) the so obtained mixture is hydrolysed;
(c) a colloidal suspension of the oxide of a metal equal to, or different from, the metal(s) used in the (a) step is added to the hydrolysis;
(d) the so obtained colloidal solution is caused to turn into a gel (gelation) having the desired shape and dimensions;
(e) the gel is washed;
(f) the gel is dried at values of temperature and pressure which are higher than the critical pressure and temperature values of the solvent used for the washing.

U.S. Pat. No. 5,409,683 discloses a two-step hydrolysis-condensation method to form metal oxide aerogels of any density, including densities of less than 0.003 g/cm3 and larger than 0.27 g/cm3. High purity metal alkoxide is reacted with water, alcohol solvent, and an additive to form a partially condensed metal intermediate. All solvent and reaction-generated alcohol is removed, and the intermediate is diluted with a non-alcoholic solvent.

U.S. Pat. No. 7,854,241 relates to an insulating complex having a metal case and insulating material confined in a vacuum between the inner wall and the outer wall. In an embodiment, the insulating material inside said case is a nano-material, in particular an aerogel.

US 2005/0047871 A1 relates to a lightweight and compact super-insulation system that is also capable of supporting a high level of compressive load. The system utilizes spacers to provide structural support and utilizes controlled buckling of a thin protective outer skin supported by spacers to form strong catenary surfaces to protect insulation material underneath. The spacers may comprise an aerogel.

US 2005/0192367 A1 discloses a reinforced aerogel monoliths as well as fiber reinforced composites thereof for a variety of uses. Compositions and methods of preparing the monoliths and composites are also provided.

US 2010/0288758 A1 discloses a multi-layered drink-container having a sleeve constructed of an aerogel.

US 2010/0320351 A1 discloses a coaster or trivet including a liquid impervious base and a liquid absorbent gel disposed on the base. The gel may comprise an aerogel.

US 2011/0072979 A1 discloses an automatic beverage brewing drinking vessel where a flexible heating element is positioned around the outer surface of the liquid container. Insulation such as aerogel composite keeps the outer wall of the drinking vessel from becoming too hot.

WO 2009/133346 A1 discloses an apparatus for cooling a beverage package. The apparatus comprises a cooling unit having a cooling chamber for accommodating the beverage package, and a cooling medium circuit for cooling the cooling chamber. An insulating material is provided on the outside of the cooling circuit. The insulating material is an aerogel. However, the python is left without insulation.

An object of the present invention is therefore to provide systems and methods for insulating the python of a beverage dispensing system.

SUMMARY OF THE INVENTION

The above object, the above advantage, and the above need together with numerous other objects, advantages, and needs which will be evident from the below detailed description of the present invention are in accordance with a first aspect of the present invention according to the present invention by a beverage dispensing assembly comprising a beverage storage area, a beverage tapping area and a beverage distribution python extending between the beverage storage area and the beverage tapping area, the beverage distribution python comprising:
- a liquid carrying line defining a centre line, the liquid carrying line comprising a beverage tube and/or a beverage guide tube, preferably a plurality of beverage tubes and/or beverage guide tubes,
- a pipe covering the liquid carrying line in a coaxial relationship to the centre line and establishing a space in-between the pipe and the liquid carrying line, and
- an insulation layer located in the space between the pipe and the liquid carrying line and encircling the liquid carrying line, the insulating layer comprising at least 80% aerogel by volume, preferably at least 90% aerogel by volume, more preferably at least 99% aerogel by volume.

The beverage dispensing assembly is typically used in professional beverage dispensing establishments such as bars, restaurants or the like having a large turnover of cold beverages such as beers and soft drinks. In such establishments, the beverage is typically stored in pressurized containers located in a storage area such a basement or an insulated cold storage room located adjacent the beverage tapping area. The beverage tapping area may include a bar counter and a tapping rod having a beverage tap at which the beverage is being dispensed. The beverage is transported from the beverage storage area to the beverage tapping area by means of the beverage distribution python.

The beverage distribution python constitutes an elongated pipe structure for conveying the beverage. The python comprises a liquid carrying line which defines a centre line in a radial cut of the python. The liquid carrying line comprises at least one beverage tube which defines the centre line in relation to said pipe. Alternatively, a bundle of beverage tubes may be used, which together define the centre line in relation to the pipe. Each beverage tube is providing a fluid connection between the beverage container and the beverage tap. Instead of the beverage tube or tubes, one or more beverage guide tubes may be used. Each beverage guide tube is adapted to receive a beverage tube.

The pipe is enclosing the beverage line in order to protect the beverage line from the outside, and also protect the environment from spillage caused by an unlikely rupture of a beverage tube. The pipe may be made of endurable materials such as metal or plastics. A space is provided in-between the liquid carrying line and the pipe.

The insulating layer located in the space in-between the liquid carrying line and the pipe should encircle and enclose the liquid carrying line in order to provide thermal insulation to the liquid carrying line and prevent any head from reaching the liquid carrying line. Any thermal bridges should be prevented. The insulation layer should include at least 80%, preferably 90% and more preferably 99%, aerogel per volume.

Aerogel comprises a very large percentage of air or other gas and thereby has an extremely low density which is comparable to or slightly larger than the density of air. The air is excapsulated within the matrix structure of the aerogel. The low density and the matrix structure of aerogels result in a very low thermal conductivity. The aerogel should be evenly distributed within the insulation layer. In this way the thermal losses and heat conduction from the outside environment into the beverage may be minimized.

Further, the aerogels also have favourable insulating properties against radiative energy. The insulation properties have their root in the Fresnels diffraction equations. Assuming a perpendicular infall of light the reflected energy (R) at the surface between the air and the aerogel may be calculated as:

$$R = \frac{(n1 - n2)^2}{(n1 + n2)^2}$$

where $n_1$ and $n_2$ is the refractive index of air and aerogel, respectively. Assuming the aerogel is based on $SiO_2$, the refractive index of $SiO2$ $n1=1.5$ and for air $n_2=1.0$, so the reflexted energy at the surface between the aerogel and the air is $$R = \frac{(0.5)^2}{(2.5)^2} = 0.04 = 4\%$$

Thus, 4% of the incoming radiative energy is reflected at every silica/air passage. It should be noted that the refractive index varies depending on the frequency of the incoming radiation. The above values for the refractive index n are for visible light. When considering IR, the refractive index for silica will be slightly larger than the corresponding value for visible light and thus it may be assumed that 4% is a fairly conservative value. When aerogels are based on metals, in particular $TiO2$ or $ZrO2$, which both have a refractive index n of about 2.74 or more, the above calculations will result in 22% of the energy being reflected per passage in the visible spectrum. Again, the refractive index is higher for IR. The aerogel comprises a lot of transitions, literally thousands even for a thin layer, and thus the number of passages which may cause a reflection will be very large, which in turn has the effect that the insulation capability is very high.

The gels which constitute the precursor material for aerogels are produced by alkoxide hydrolysis. For instance, tetra-ethoxy-ortho-silan=TEOS=Si $(OC_2H_5)_4$ dissolved in ethanol/water and a drip of HCl (hydrochloric acid) will form a precursor gel suitable for being transformed into an aerogel. The formula $C_2H_5OH:H_2O:TEOS$ in the ratio (per weight) of 4:4:1 will form a suitable gel. The applicant has performed proof of concept experiments in which a gel was formed containing 670 g $H_2O/C_2H_5OH$ and 100 g $SiO_2$. The hydrolysis lasted a few days with little or almost no heat formation. In order to transform into an aerogel, the gel must be dried.

The drying of the gel in order to form an aerogel is somewhat problematic. The capillary tensile stress $$P = 2\frac{\gamma}{r}$$

where r is the capillary radius and y is the surface tension for the liquid would lead to a collapse of the matrix structure of the gel in case the gel is to be dried under normal room temperature and pressure. The permeability $$D = \frac{(1-\rho)^3}{5 \cdot \rho \cdot s \cdot \rho_s}$$

where $\rho$ is the relative density=bulk density/skeletal, $\rho_s$ is the skeletal density=2.2 g/ml. This is known as the Carman-Kozeny equation.

The wet strength of the above 4:4:1 gel is about 0.01 MPa. The pore size is about 2 nm. The surface area s is about 1800 m$^2$/g which leads to, in the beginning, a permeability D of $2.94 \cdot 10^{14}$ cm$^2$. This yields a minimum drying time of 3000 h at 900 m2/g, however, bigger pores may speed up the drying. The minimum drying time is 200 h at 200 m2/g.

A zerogel (or xerogel) is a special type of aerogel which is formed when such a gel as described above is dried very slowly in an atmosphere saturated with solvent vapor. For example, the gel may be put in a hermetically sealed jar and a pinhole may be made in the lid. After between two weeks or two months at room temperature and pressure, the gel is dry. The drying rate may be determined by weighing the jar periodically, e.g. every day. In the present context reference will be made to aerogels, however, it is understood that the general term aerogel is understood to also include zerogels.

An aerogel, on the other hand, may preferably be formed by supercritical drying, which should be performed above the critical temperature of the solvent used.

Water has a critical temperature $T_{critical} > 374°$ C. at a pressure P>22 MPa Ethanol has a critical temperature $T_{critical} > 243°$ C. at a pressure P>6.36 MPa The gel may be transformed into aerogel by increasing the temperature of the water/ethanol solvent to 290° C. during 24 h. The temperature increase will cause the pressure P to increase to 9 MPa. Subsequently, the temperature may be decreased to room temperature during another 24 h. This aerogel is not a zerogel, but both are SiO$_2$ monoliths.

In another example, an aerogel can be made with C2H5OH @ 243 C and 62.96 bar.

To increase the pore size of the gel, Carbo-o-sil M5 from Cabot or Aerosil OX 50 from Degussa may be added to the gel. These are so called flame hydrolysed silikoxide powders, which are spray cooled Si or pumice stone or other vulcanoic pyroclastics.

Other alkoxides which may be used instead of TEOS to form the gel include:
—OCH3 methoxide
—OCH(CH3)2 iso-propoxide
—OC(CH3)3 tert-butoxide
There are many more.
Other precursor metals/materials include:
Sec-Al(OC4H9)
Ge(OC2H5)4
Ti(OC2H5)4
Zr(OC3H7)4
Sr(NO3)2
Fe(OC2H5)3
La(NO3)3
Al(NO3)3.9H2O
ZrOC12.5H2O
LUDOX SiO2 dispersions from the company DuPont
Zr(NO3)4.5H2O
B(OCH3)3
Ba(OC2H5)3
H3BO3
NaOCH3
KOC2H5
P(OC2H5)3+NaOCH3
n-B(OC4H9)3+LiOCH3
Ce(OC3H7)4

It is not necessary that the alkoxide used in the gel should be derived from the alcohol used to moderate the hydrolysis. It might advantageous to use a different alkoxide. Preferably, an azetropic mixture exists in the gel after hydrolysis. The mixture of 96% ethanol with 4% water is such an azeotropic mixture, so if ethanol:water:TEOS is mixed in the ratio 17:6:1, the resulting gel is an azeotropic mixture of etanol: water 21:2. Numerous other azeotropes with other alcohols exist.

The formation of aerogel may be controlled in numerous ways. Slow generation of acidity by hydrolysis of Chloralhydrate. Other matrix liquids like PEG diacrylate may be used. Further, drying control agents, such as formamide, makes pore size distribution extremely unimodal and narrow. Immobilized dyes in the gel matrix such as N-(3-(triethoxysily)propyl)2.4-dinitrophenylamine or 2,4-dinitrophenyl-1-amine-n-propyl-Si(OC2H5)3 may be used.

In situ polymerization is feasible by using an oligomer with a rheology like milk which is injected into the python. After polymerization the gel is dried from an end on. Cabot M5 or coarser may be used in order to get a pore size of about 20 to 50 nm, which allows pinhole drying.

One can also take bulk made Aerogel, granulate it suitably and inject it into the python or disperse it in the above "milk" and in situ polymerise. This two stage process is more forgiving.

The density of the finalized gel is controlled by the ratio of the ingredients. The above mentioned 4:4:1 gel leads to 100 g SiO$_2$ in 770 ml gel, with a skeletal density of 2.2 g/ml gives a density of 0.013 kg/m$^3$. A 16:16:1 gel will give a density below 0.01 kg/m$^3$.

Fluorine ions may be used for making stable and strong gels. Further, instead of air, an insulating gas, i.e. an immobilised high insulating pore volume gas such as SF6 as used in windows may be used in order to improve the insulation capabilities of the aerogel. Alternatively, Argon gas may be used.

According to a further embodiment of the first aspect of the present invention, the insulating layer defines a thermal conductivity in the range of 0.001 W/mK to 1 W/mK, such as 0.010 W/mK to 0.1 W/mK. Such thermal conductivities are feasible with aerogels.

According to a further embodiment of the first aspect of the present invention, the aerogel including a precursor material has a refractive index above 2.0, such as germanium oxides, titanium oxides or zirconium oxides. By using a precursor material having a high refractive index, a significant portion of the incoming IR, UV and visual light will be reflected at each air/matrix passage. In this way, the thermal insulation capability of the aerogel is increased. Such materials include the above mentioned oxides.

According to a further embodiment of the first aspect of the present invention, the aerogel including a precursor material is a silicon based alkoxide, such as tetraethyl orthosilicate (TEOS). Using a silicon based alkoxide as precursor for the aerogel, a very stable and highly insulating aerogel is achieved. The density of the finalized gel is controlled by the ratio of the ingredients. The above mentioned 4:4:1 gel leads to 100 g $SiO_2$ in 770 ml gel, with a skeletal density of 2.2 g/ml gives a density of 0.013 $kg/m^3$. A 16:16:1 gel will give a density below 0.01 $kg/m^3$.

According to a further embodiment of the first aspect of the present invention, the aerogel including a gas has a lower thermal conductivity than air, the gas preferably being argon, carbon dioxide or sulfurhexafluoride. By using an insulating gas instead of air within the matrix structure of the aerogel, the insulating capabilities of the aerogel will be increased. Such aerogels may be achieved by performing the drying in an insulating gas atmosphere, such as an Argon of $SF_6$ atmosphere.

According to a further embodiment of the first aspect of the present invention, the liquid carrying line further comprises a cooling liquid supply tube and a cooling liquid return tube. In order to keep the beverage at a constant temperature over an extended time period, the liquid carrying line may include a cooling liquid tube located adjacent the beverage tube or tubes. In practice, a cooling liquid supply tube and a cooling liquid return tube will be used which together form a loop together with a cooling device such as a refrigerator or the like. A cooling liquid having a constant low temperature is circulating in the cooling liquid tube.

According to a further embodiment of the first aspect of the present invention, the beverage distribution python further includes a supporting arrangement extending between the liquid carrying line and the pipe for supporting the liquid carrying line at a specific distance from the pipe. In order to keep the liquid carrying line at a central position within the pipe, a supporting arrangement may be used. The supporting arrangement may in some embodiments be used only during the installation and production phase in order to fixate the liquid carrying line when the aerogel is introduced into the space in-between the liquid carrying line and the pipe.

According to a further embodiment of the first aspect of the present invention, the supporting arrangement comprises a number of distance rods, the number preferably being two, three or four. Rods are preferred since the rods may be made thin in order to reduce the thermal bridge between the liquid carrying line and the pipe.

According to a further embodiment of the first aspect of the present invention, the liquid carrying line is enclosed with a foil, the foil preferably being made of metal or plastics. In order to keep the liquid carrying line comprising a plurality of tubes at a defined position and in order to reduce the abrasion on the one or more tubes, a foil may be used for covering the liquid carrying line. The foil may be made of plastics, however, metal has the additional advantage of increasing the reflection of incoming radiation.

According to a further embodiment of the first aspect of the present invention, the liquid carrying line of the beverage distribution python is connectable to another liquid carrying line of another beverage distribution python. In this way a long python may be built from smaller python parts. The python part may have different shapes such as horizontal, vertical or bent.

The above object, the above advantage, and the above need together with numerous other objects, advantages, and needs which will be evident from the below detailed description of the present invention are in accordance with a second aspect of the present invention by a method of producing a beverage distribution python for extending between a beverage storage area and a beverage tapping area in a beverage dispensing assembly, the method comprising:

providing a liquid carrying line defining a centre line, the liquid carrying line comprising a beverage tube and/or a beverage guide tube, preferably a plurality of beverage tubes and/or beverage guide tubes, providing a pipe covering the liquid carrying line in a coaxial relationship to the centre line and establishing a space in-between the pipe and the liquid carrying line, introducing a plurality of aerogel granulates into the space between the pipe and the liquid carrying line, thereby establishing a solid insulating layer located in the space between the pipe and the liquid carrying line and encircling the liquid carrying line, the insulating layer comprising at least 80% aerogel by volume, preferably at least 90% aerogel by volume, more preferably at least 99% aerogel by volume.

The method according to the second aspect of the present invention may be used in order to produce the assembly according to the first aspect of the present invention. The granulates may be introduced by a filling hose. The granulates should have a suitable shape, e.g. ball shaped, and a suitable size in relation to the space between the pipe and the liquid carrying line. Typical diameters of the granulates range from 1 mm to 1 cm.

According to a further embodiment of the second aspect of the present invention, the plurality of aerogel granulates is introduced into the space between the pipe and the liquid carrying line as a slurry including a liquid polymer or oligomer, the method comprising the further step of solidifying the liquid polymer or oligomer. Once solidified, the (liquid) polymer or oligomer will fixate the aerogel granulates in a specific position and prevent the aerogel from being destructed due to abrasion.

According to a further embodiment of the second aspect of the present invention, the aerogel granulates are divided into a first type of aerogel granulates having a first volume and a second type of aerogel granulates having a second volume, the first volume being at least ten times larger than the second volume. A similar method of packing granulates of activated carbon in an optimal way is described in EP 2 444 365 A1 to which reference is made. In this way, the aerogel may be optimally packed in that the spacing between the larger granulates is filled by smaller granulates.

The above object, the above advantage, and the above need together with numerous other objects, advantages, and needs which will be evident from the below detailed description of the present invention are in accordance with a third aspect of the present invention obtained by a method of producing a beverage distribution python for extending between a beverage storage area and a beverage tapping area in a beverage dispensing assembly, the method comprising:

providing a liquid carrying line defining a centre line, the liquid carrying line comprising a beverage tube and/or a beverage guide tube, preferably a plurality of beverage tubes and/or beverage guide tubes, providing a pipe covering the liquid carrying line in a coaxial relationship to the centre line and establishing a space in-between the pipe and the liquid carrying line, establishing a gel within the space in-between the pipe and the liquid carrying line by introducing an aerogel precursor material and a solvent liquid into the space in-between the pipe and the liquid carrying line, and performing a supercritical drying of the gel by increasing the temperature and pressure of the gel, allowing the gel to form a supercritical fluid within the pipe, and reducing the temperature and pressure of the gel, thereby forming a solid insulating layer of aerogel within the space in-between the pipe and the liquid carrying line and encircling the liquid carrying line, the insulating layer comprising at least 80% aerogel by volume, preferably at least 90% aerogel by volume, more preferably at least 99% aerogel by volume.

The method according to the third aspect of the present invention may be used in order to produce the assembly according to the first aspect of the present invention. The method according to the third aspect of the present invention may be used in order to produce the assembly according to the first aspect of the present invention. The aerogel may also be produced "in situ" inside an already existing python has liquid carrying line and a pipe. The gel or the precursor materials for the gel may be introduced into the space in-between the liquid carrying line and the pipe. After hydrolysis, the gel may be dried under supercritical conditions in order to form an aerogel monolith or several aerogel monoliths within the space in-between the liquid carrying line and the pipe.

The above object, the above advantage, and the above need together with numerous other objects, advantages, and needs which will be evident from the below detailed description of the present invention are in accordance with a first aspect of the present invention obtained by a method of producing a beverage distribution python for extending between a beverage storage area and a beverage tapping area in a beverage dispensing assembly, the method comprising:
  providing a liquid carrying line defining a centre line, the liquid carrying line comprising a beverage tube and/or a beverage guide tube, preferably a plurality of beverage tubes and/or beverage guide tubes,
  wrapping a first insulation layer around the liquid carrying line to overlap itself,
  wrapping a second insulation layer around the first insulation layer to overlap itself, the first and second insulating layers being flexible and comprising at least 80% aerogel by volume, preferably at least 90% aerogel by volume, more preferably at least 99% aerogel by volume,
  providing a pipe covering the second insulating layers in a coaxial relationship to the centre.

The method according to the fourth aspect of the present invention may be used in order to produce the assembly according to the first aspect of the present invention. The first and second insulation layers are flexible such that they may be wrapped. The layers may be made flexible by the introduction of a polymer or oligomer and may e.g. constitute aerogel mats as described above. The first and second layers will at least partially overlap in order to avoid any gaps which would result in a reduction of the overall thermal insulation capability of the python.

According to further embodiments according to the present invention, the aerogel includes a flame hydrolysed silikoxide powder. Further, it may be assured that after hydrolysis, an azeotropic mixture exists. Yet further, the aerogel may include fluorine, chloralhydrate, PEG.

BRIEF DESCRIPTION OF THE DRAWINGS

FIG. 6A-C show a number of python segments which are interconnectable and which are insulated by aerogel

DETAILED DESCRIPTION OF THE DRAWINGS

Figure 1:
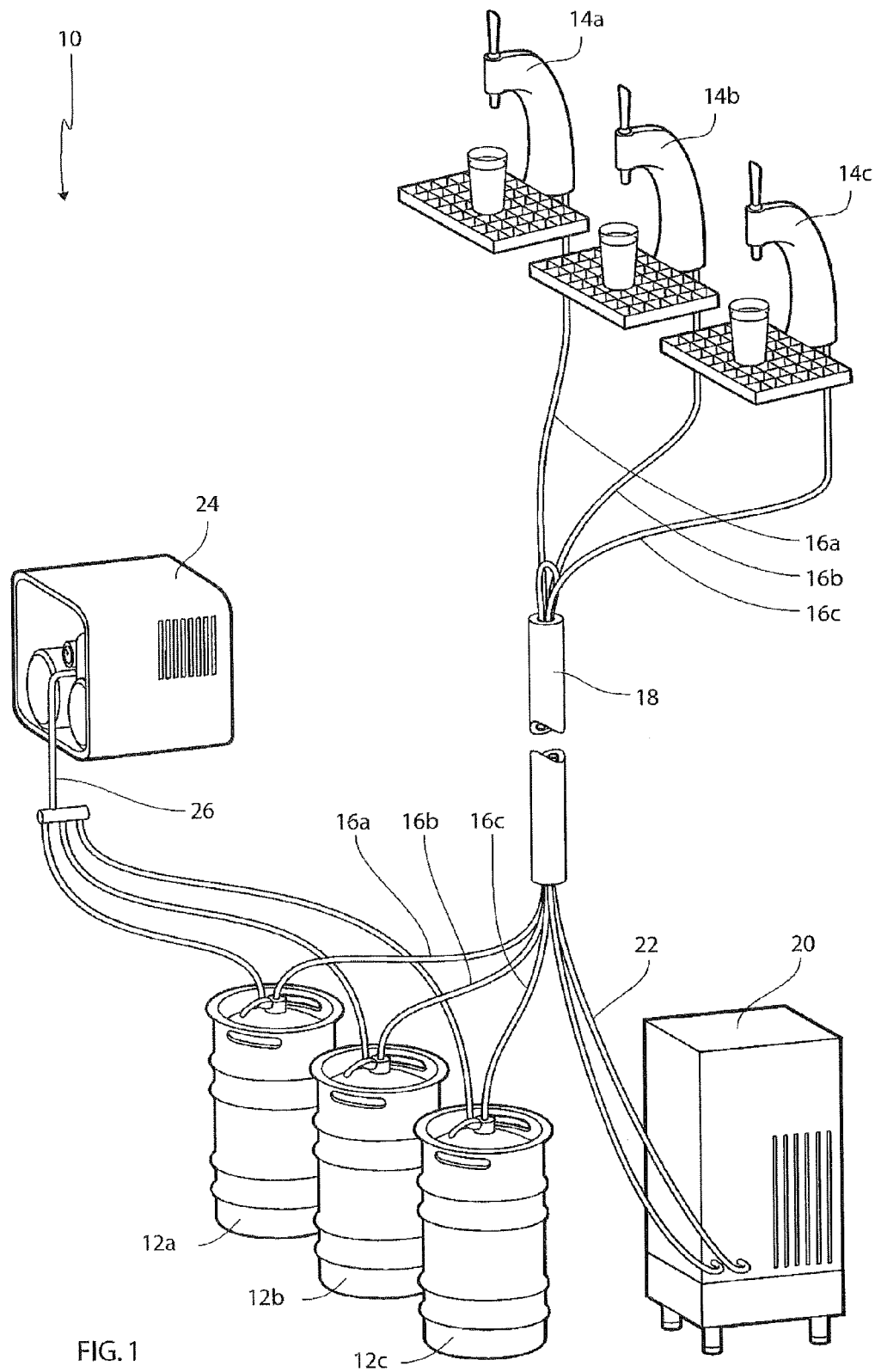
FIG. 1 shows a conventional beverage dispensing assembly comprising three steel kegs which are connected to respective beverage taps via an insulated and chilled python.

FIG. 1 shows a perspective view of a conventional beverage dispensing assembly 10 comprising three steel kegs 12a, 12b, 12c which are located in a beverage storage area, e.g. a basement below a bar or the like. The three steel kegs 12a, 12b, 12c are connected to respective beverage taps 14a, 14b, 14c, via separate beverage tubes 16a, 16b, 16c. The beverage taps 14a, 14b, 14c are located in a beverage tapping area, e.g. a bar, restaurant or the like. The beverage tubes 16a, 16b, 16c may preferably be made of flexible plastics. The python 18 further comprises a cooling liquid tube 22 which is loop shaped (i.e. forming a supply tube and a return tube) and located within the python 18 adjacent the beverage tubes 16a, 16b, 16c. The beverage tubes 16a, 16b, 16c together with the cooling liquid tube 22 are forming a liquid carrying line which in turn is centrally located within an insulated python 18. The cooling liquid tube 22 is connected to a cooling unit 20. A cooling liquid (not shown) is circulating within the cooling liquid tube 22 from the cooling unit 20, via the python 18, and back to the cooling unit 20. Further, a pressurization unit 24 provides $CO_2$ gas pressure to each of the three steel kegs 12a, 12b, 12c via a pressure line 26.

Figure 2:
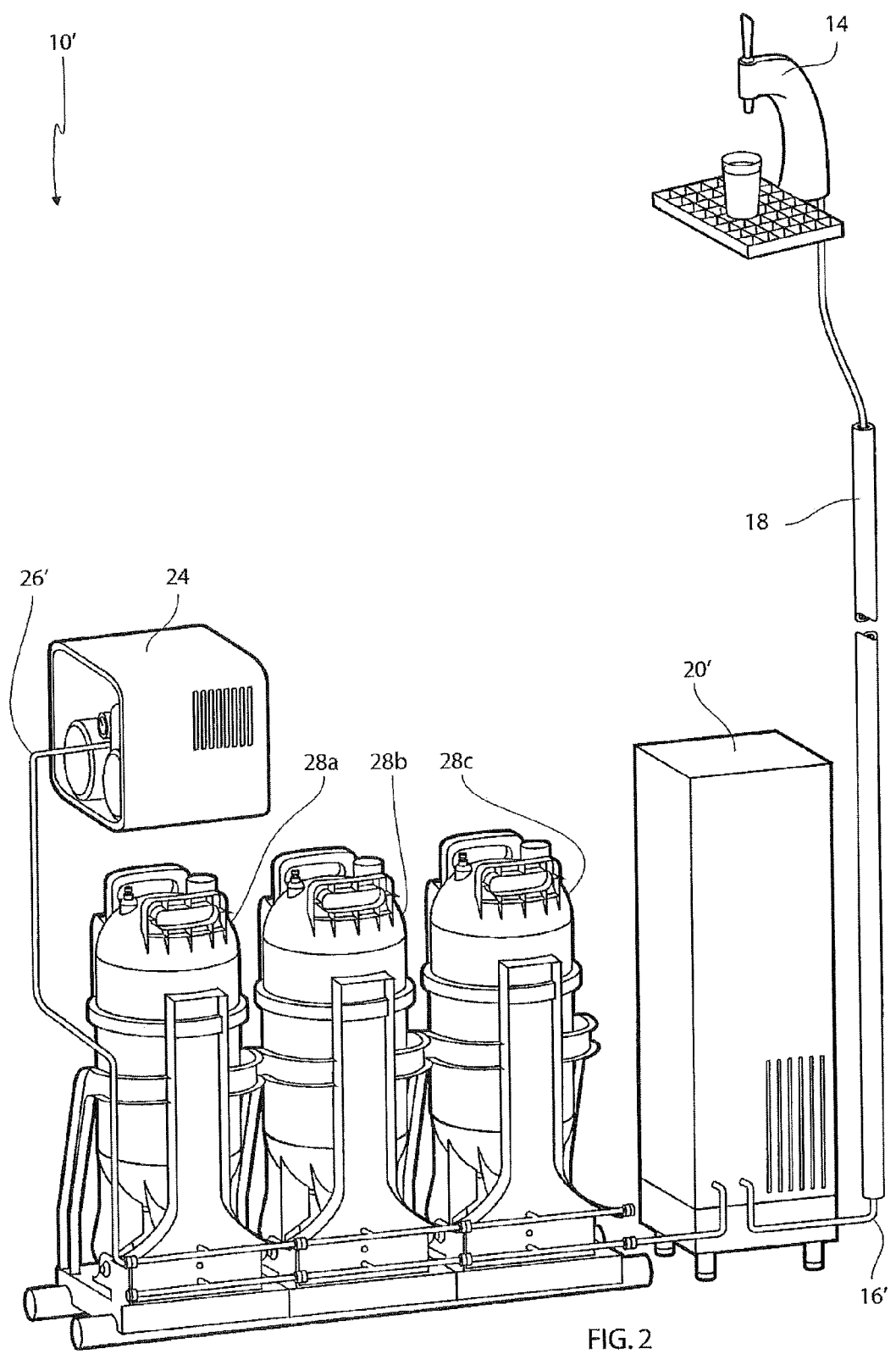
FIG. 2 shows a modern beverage dispensing assembly comprising three pressure chambers, an insulated python, an in line cooling unit and a tap.

FIG. 2 shows a perspective view of a modern beverage dispensing system 10'. The beverage dispensing system 10' comprises three pressure chambers 28a, 28b, 28c which each includes a flexible beverage container (not shown). The pressure chambers 28a, 28b, 28c are each pressurized by a pressure line 26' which in turn is connected to a pressurization device 24. The beverage containers (not shown) within the pressure chambers 28a, 28b, 28c are connected in series to a beverage tube 16'.

The beverage tube 16' is led through a cooling unit 20' which lowers the temperature of the beverage to a level suitable for consumption. The beverage tube 16' is subsequently led through a python 18, which is insulated by aerogel, to a beverage tap 14.

Figure 3:
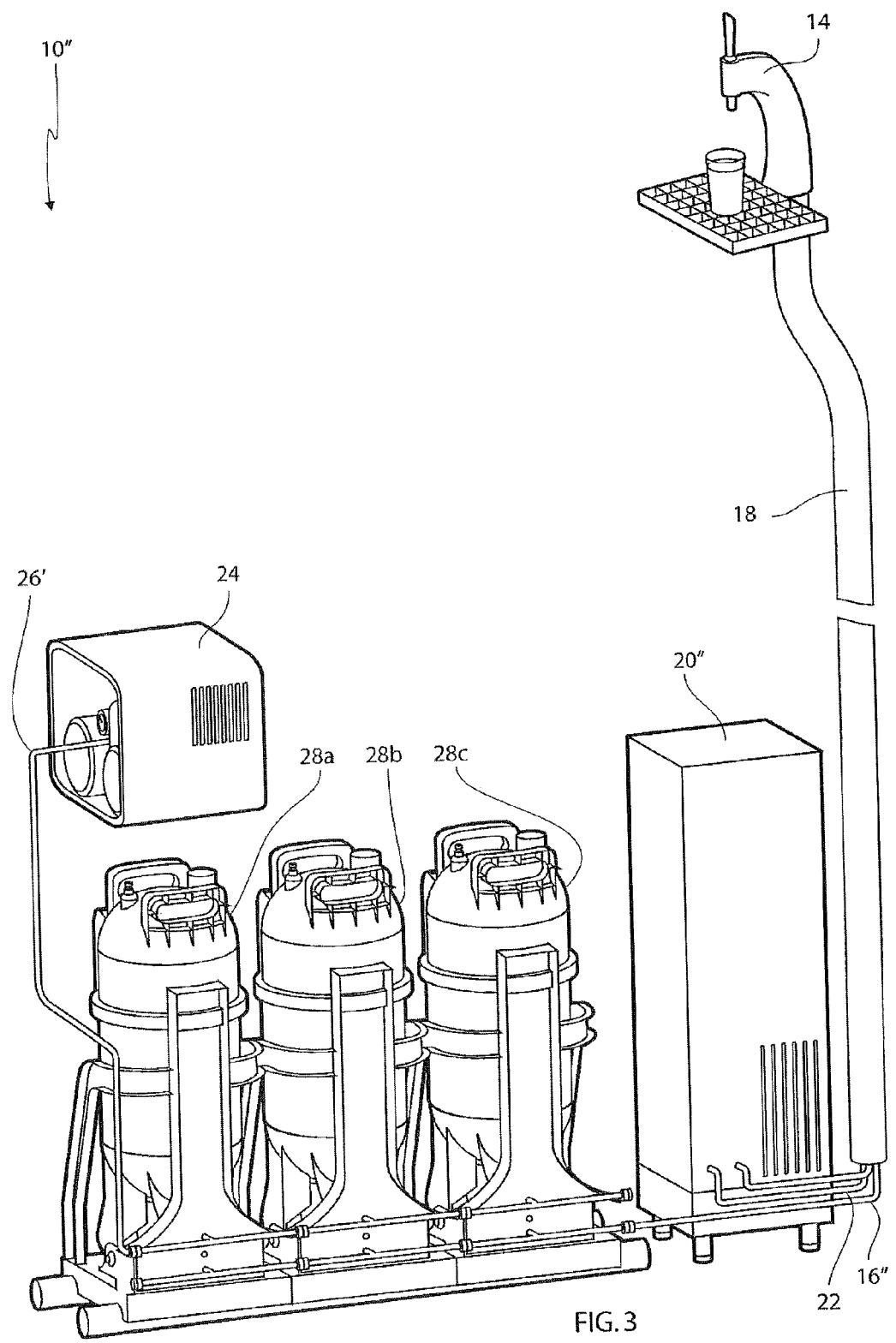
FIG. 3 shows a modern beverage dispensing assembly in which the python is chilled and extends all the way between the cooling unit and the tap.

FIG. 3 shows a perspective view of a modern beverage dispensing system 10" which is similar to the system shown in connection with FIG. 2, however, the beverage tube 16" is not led through the cooling unit 20" but is directly led into the insulated python 18 together with a cooling liquid tube 22. A cooling liquid (not shown) is circulating within the cooling liquid tube 22 from the cooling unit 20", via the python 18, and back to the cooling unit 20". The python 18 extends from the beverage storage area to the beverage tap 14.

Figure 4:
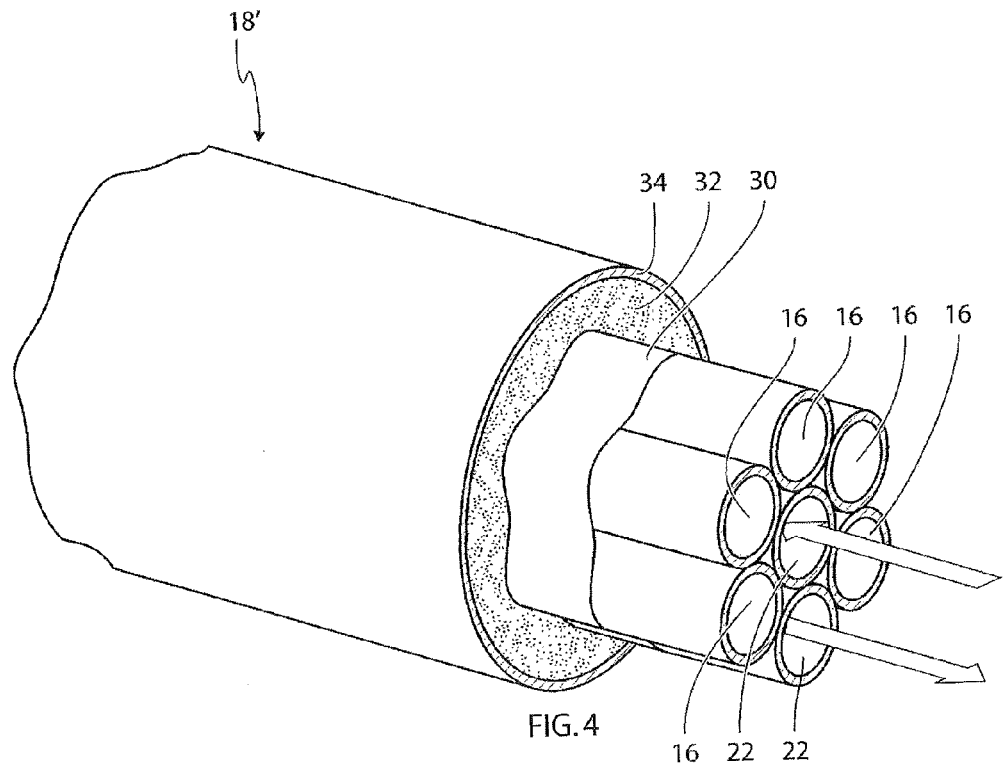
FIG. 4 shows a prefabricated python which is insulated by a plurality of aerogel granulates.

FIG. 4 shows a cut out perspective view of a python 18' shown in FIGS. 1-3, which may be used in connection with any of the beverage dispensing systems 10, 10' or 10". The python 18' includes a beverage line comprising a bundle of liquid carrying tubes among which a cooling liquid tube 22 is shown with reference to the arrows both in the supply direction and in the return direction in which cooling liquid is flowing. The liquid carrying line further includes a plurality of beverage tubes 16 in which a beverage such as beer is flowing. The tubes may be made of flexible plastics. In the present embodiment, the cooling liquid supply tube 22 (having an inwards arrow) constitutes the centre line of both the beverage line and the python as such, and the adjacent beverage tubes 16 are kept at a constant low temperature by the cooling liquid (not shown), thereby compensating for any thermal losses in the python 18'.

It is contemplated that the cooling liquid tube 22 may be omitted in the beverage dispensing system 10' shown in connection with FIG. 2. Further, a single beverage tube 16 may be included such as in the beverage dispensing system 10" shown in connection with FIG. 3.

The liquid carrying tubes are optionally coaxially enclosed by a thin metal or plastic foil 30 in order to ensure that the bundle of tubes are kept close together in a unitary fashion. Further, in case a reflective foil 30 is used, any heat absorbed by the python 18' may be reflected, thereby further improving the thermal insulation. The foil 30, and thus the liquid carrying line, are coaxially enclosed by an insulating layer of aerogel 32. The aerogel layer 32 comprises a plurality of aerogel granulates. The granulates are divided between at least two granulate sizes, in which the first size defines a ten times larger volume than the second size. In this way the aerogel granulates may be optimally packed. When the aerogel granulates are distributed over two sizes, the small sized aerogel granulates will fit in the space between the large size granulates, and thus an aerogel density of over 90% may be achieved. The higher the aerogel density, the better thermal insulation is achieved.

The python 18' further comprises a pipe 34 which is coaxially enclosing the aerogel granulates 32 such that the aerogel granulates 32 are kept in place. The pipe 34 may be made of metal or plastics or any other suitable solid material. It is further understood that the respective ends of the python 18' is closed off between the pipe 34 and the liquid carrying line in order to prevent loss of insulation material at the respective ends of the python.

Figure 5:
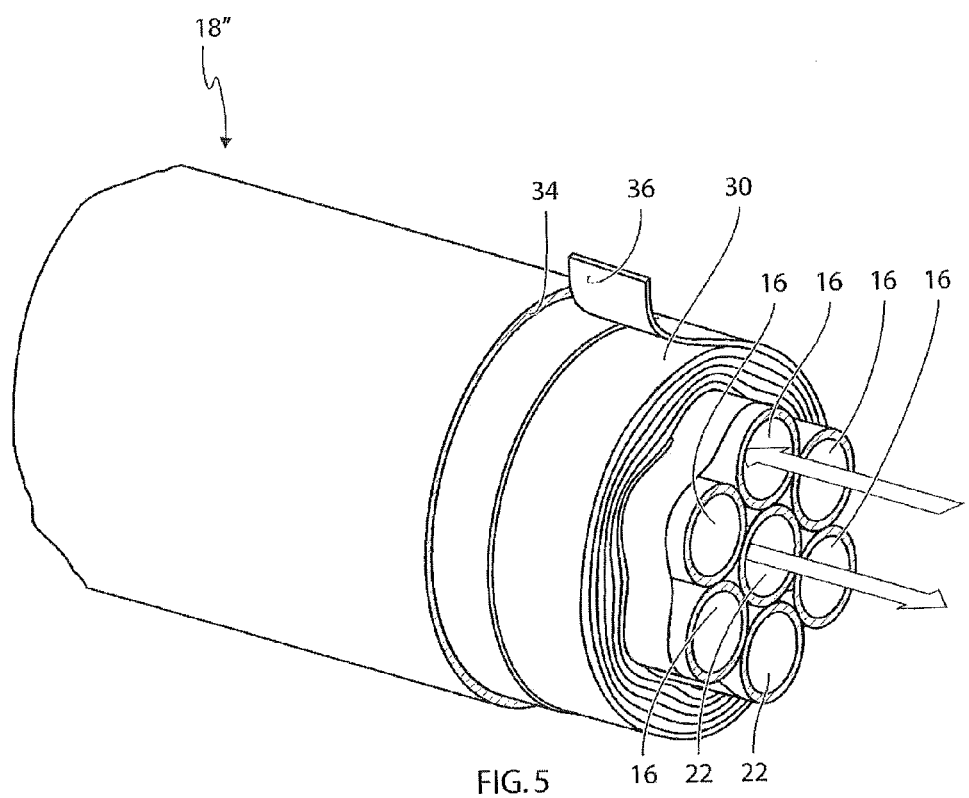
FIG. 5 shows a prefabricated python which is insulated by flexible aerogel layers.

FIG. 5 shows a cut out perspective view of a python 18", resembling the python 18' of FIG. 4 except that the python 18" is insulated by an aerogel in the form of a plurality of mats 36. The mats 36 are flexible and preferably wrapped around the foil 30 and thus around the bundle of liquid carrying tubes 16, 22. Each of the mats 36 will partially overlap themselves and the mats 36 will at least partially overlap each other in order to avoid any gaps which would result in a reduction of the overall thermal insulation capability of the python 18".

FIG. 6A shows a side view of a set of prefabricated python parts 38, 38', 38". The python parts comprise a vertical python part 38, a bend python part 38' and a horizontal python part 38". Each python part 38, 38', 38" may be manufactured according to the method as laid out in connection with FIGS. 3 and 4. Each python part 38, 38', 38" comprises a respective cooling liquid supply and return guide tube 22' and a beverage guide tube 16', which guide tubes are adapted to receive corresponding guide tubes as will be explained in connection with FIG. 6C. The guide tube may have the same properties as the cooling liquid tubes and beverage tubes previously described. The guide tube at the respective ends of the python parts 38, 38', 38" defines a male connector 40 or a female connector 42. Each python part 38, 38', 38" includes an aerogel insulating layer 32 and a pipe 34 enclosing the aerogel insulation layer 32.

FIG. 6B shows a side view of the set of prefabricated python parts 38, 38', 38" when assembled into a python 18'''. By connecting the male connector 40 of a python part to a corresponding female connector 42 of an adjacent python part, a python having horizontal sections, bend sections, vertical sections and various other shapes may be designed. In this way, the python 18''' may be designed to extend from the beverage storage area to the beverage tapping area even in case they are not being immediately adjacent to each other.

FIG. 6C shows a side view of the introduction of a beverage tube 16 into the beverage guide tube 16' and the introduction of a cooling liquid tube 22 into the cooling liquid guide tube 22. It may be considered to introduce the beverage directly into the beverage guide tube 16' and the cooling liquid directly into the cooling liquid guide tube 22'. However, in order to ensure that no leakage will occur, it is advantageous to introduce a separate beverage tube 16 into the beverage guide tube 16' and a separate cooling liquid tube 22 into the cooling liquid guide tube 22.

Figure 7A:
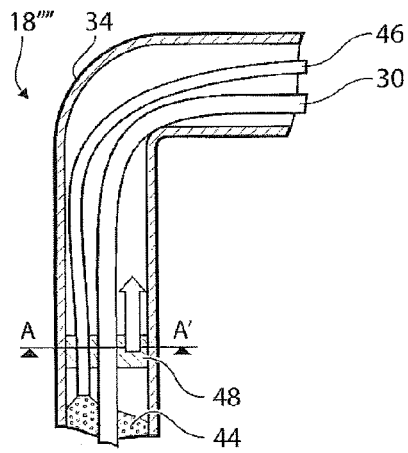
FIG. 7A-F show a method of producing an insulated python which may be used both "in situ" and for pre-production of pythons.

FIG. 7A shows a side view illustrating a method of producing a python 18'''' using a slurry 44 comprising a plurality of aerogel granulates and a liquid polymer, such as polypropylene. The method is suitable both for preproduction of pythons or python parts, and for "in situ" production, i.e. the slurry 44 is introduced in an already existing python in the space in-between the pipe 34 and the liquid carrying line including the bundle of tubes either in order to insulate an otherwise non-insulated python 18 or as a replacement of an existing insulation.

The liquid carrying line, i.e. the bundle of tubes, is in the present embodiment covered by a foil 30, however, the foil 30 is as such optional and consequently the bundle of tubes may be used without the foil 30. The slurry 44 is introduced into the space in-between the foil 30 and the pipe 34 via a slurry hose 46. It is evident that the end of the python 18 should be closed off between the pipe 34 and the liquid carrying line in order to prevent spillage. The liquid carrying line and the slurry hose 46 are kept in a substantially centered position by a supporting arrangement 48.

Figure 7B:
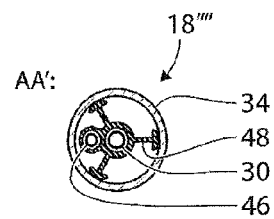

FIG. 7B shows a cut out view of a python 18'''' for illustrating the supporting arrangement 48 in the form of three outwardly oriented rods. The supporting arrangement 48 holds the foil 30 covering the bundle of tubes in a centred position within the pipe 34. The slurry hose 46 is located between the rods of the supporting arrangement 48.

Figure 7C:
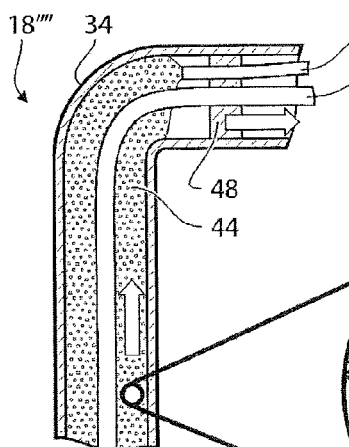

FIG. 7C shows a side view of a python 18'''' in which the space in-between the foil 30 covering the bundle of tubes and the pipe 34 has been filled by the slurry 44. The supporting arrangement 48 which is sliding against the inner surface of the pipe 34, has been moved together with the slurry 44 towards the upper end of the python 18''''.

The supporting arrangement 48 should preferably not be left within the finalized python 18 since it may act as a thermal bridge between the foil 30 covering the bundle of tubes and the pipe 34. The supporting arrangement 48 may comprise rods (not shown) which support the foil 30 covering the bundle of tubes in relation to the inner wall of the pipe 34. The rods (not shown) may either slide against the wall or be arranged to collapse when the slurry 44 enters the space in-between the foil 30 and the pipe 34.

Figure 7D:
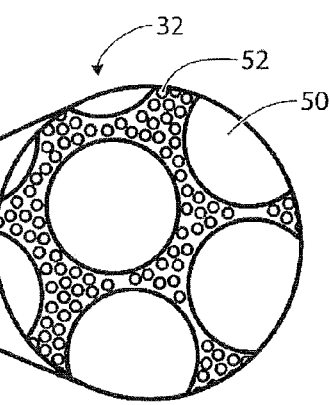

FIG. 7D shows a close-up view of the python 18'''' as shown in FIG. 4 comprising an insulation layer comprising aerogel granulates. The insulation layer 32 comprises large 50 and small 52 aerogel granulates. The small aerogel granulates 52 will fit in the space between the large granulates 50. The large 50 and small 52 aerogel granulates have a volumetric ratio of ten to one in order to achieve a high density of aerogel in relation to free air inbetween the aerogel granulates 50, 52.

Figure 7E:
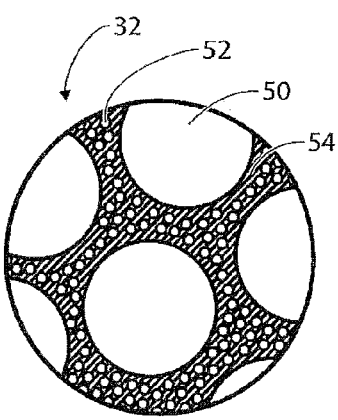

FIG. 7E shows a close-up view of the python 18"" having a solidified slurry 44. The slurry 44 comprises large 50 and small 52 aerogel granulates which are suspended in solidified polypropylene 54. The large 50 and the small 52 aerogel granulates have a volumetric ratio of ten to one in order to achieve a high density of aerogel in relation to polypropylene. In this way the aerogel granulates 50, 52 are fixated within the python 18"".

Figure 7F:
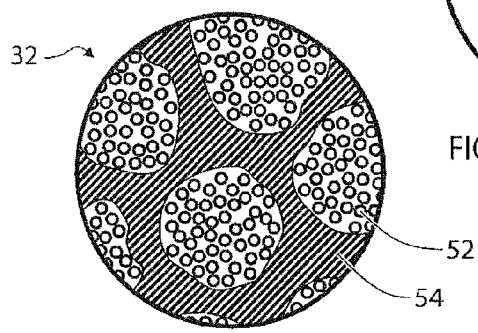

FIG. 7F shows a close-up view of a python 18"" having a solidified slurry 44. In the present embodiment only small aerogel granulates 52 are used. The small aerogel granulates 52, which have the advantage of being less fragile, are clustered and suspended within large cavities within the polypropylene 54.

Figure 8:
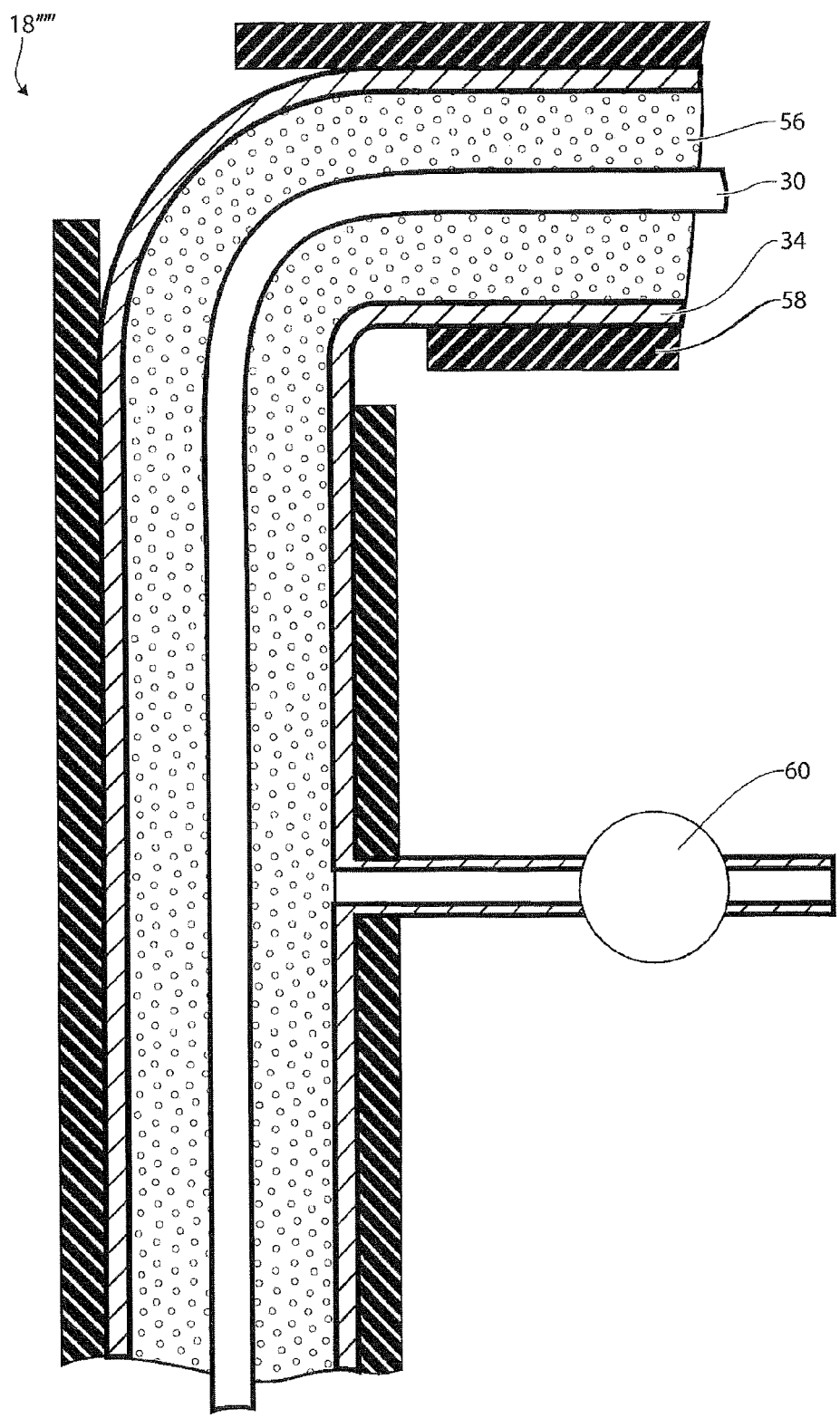
FIG. 8 shows a python "in situ" aerogel production method using heating pads and a pump.

FIG. 8 shows a side view illustrating a method of "in situ" aerogel production within a non insulated python 18"". A mixture of alkoxide (in the present case TEOS), ethanol, water and HCl is injected into the space in-between a foil 30 covering the bundle of tubes of the liquid carrying line and the outer python pipe 34. The optional foil 30 hereby protects the tubes during the hydrolysis which forms the gel 56. Alternatively, a pre-mixed gel 56 may be introduced. The gel 56 is subsequently transformed into a supercritical fluid using heating pads 58 located outside the pipe 34 for elevating the temperature of the gel 56 and an air pump 60 for elevating the pressure applied to the gel 56 within the pipe 60. In this way the precursor ethanol is removed from the python 18"" and exchanged by air or alternatively an insulating gas. The remaining $SiO_2$ will form the aerogel. The supercritical drying is used in order to achieve a fast aerogel formation, and thus is especially suitable for in situ aerogel production.

Although the present invention has been described above with reference to specific embodiments of the python and also specific embodiments of the method, it is of course to be contemplated that numerous modifications be deduced by a person having ordinary skill in the art and modifications readily perceivable by a person having ordinary skill in the art are consequently to be construed part of the present invention as defined in the appending claims.

LIST OF PARTS WITH REFERENCE TO THE FIGURES

10. Beverage dispensing assembly
12. Beverage keg
14. Beverage tap
16. Beverage tube/guide tube
18. Python
20. Cooling unit
22. Cooling liquid tube
24. Pressurization unit
26. Pressure line
28. Pressure chamber
30. Foil covering liquid carrying tubes
32. Insulation layer
34. Pipe
36. Aerogel mats
38. Python part
40. Male type connector
42. Female type connector
44. Slurry
46. Slurry hose
48. Supporting arrangement
50. Large aerogel granulates
52. Small aerogel granulates
54. Polymer
56. Gel
58. Heating pads
60. Gas pump

The invention claimed is:

1. A beverage dispensing assembly comprising a beverage storage area, a beverage tapping area, and a beverage distribution python extending between the beverage storage area and the beverage tapping area, wherein the beverage distribution python comprises:
    a liquid carrying line defining a center line and comprising at least one of a beverage tube and a beverage guide tube;
    a pipe covering the liquid carrying line in a coaxial relationship to the center line and establishing a space between the pipe and the liquid carrying line; and
    an insulation layer located in the space between the pipe and the liquid carrying line and encircling the liquid carrying line, the insulation layer comprising at least 80% aerogel by volume.

2. The beverage distribution assembly of claim 1, wherein the insulation layer has a thermal conductivity in the range of 0.001 W/mK to 1 W/mK.

3. The beverage distribution assembly of claim 1, wherein the aerogel includes a precursor material having a refractive index above 2.0.

4. The beverage distribution assembly of claim 3, wherein the precursor material is selected from the group consisting of one or more of a germanium oxide, a titanium oxide, and a zirconium oxide.

5. The beverage distribution assembly of claim 3, wherein the precursor material is a silicon-based alkoxide.

6. The beverage distribution assembly of claim 5, wherein the precursor material is tetraethyl orthosilicate (TEOS).

7. The beverage distribution assembly of claim 1, wherein the aerogel includes a gas having a lower thermal conductivity than air.

8. The beverage distribution assembly of claim 7, wherein the gas is selected from the group consisting of at least one of argon, carbon dioxide, and sulphur hexafluoride.

9. The beverage distribution assembly of claim 1, wherein the liquid carrying line further comprises a cooling liquid supply tube and a cooling liquid return tube.

10. The beverage distribution assembly of claim 1, wherein the beverage distribution python further includes a supporting arrangement extending between the liquid carrying line and the pipe, the supporting arrangement being configured for supporting the liquid carrying line at a specific distance from the pipe.

11. The beverage distribution assembly of claim 10, wherein the supporting arrangement comprises at least two distance rods.

12. The beverage distribution assembly of claim 1, wherein the liquid carrying line is enclosed within a foil.

13. The beverage distribution assembly of claim 1, wherein the liquid carrying line of the beverage distribution python is connectable to another liquid carrying line of another beverage distribution python.

14. A method of producing a beverage distribution python for extending between a beverage storage area and a beverage tapping area in a beverage dispensing assembly, the method comprising:

providing a liquid carrying line defining a center line and comprising at least one of a beverage tube and a beverage guide tube;

providing a pipe covering the liquid carrying line in a coaxial relationship to the center line and establishing a space between the pipe and the liquid carrying line; and introducing aerogel granulates into the space between the pipe and the liquid carrying line, thereby establishing a solid insulating layer located in the space between the pipe and the liquid carrying line and encircling the liquid carrying line, the insulating layer comprising at least 80% aerogel by volume.

15. The method of claim 14, wherein the aerogel granulates are introduced into the space between the pipe and the liquid carrying line as a slurry comprising a liquid including at least one of a polymer and an oligomer, the method comprising the further step of solidifying the liquid.

16. The method of claim 14, wherein the aerogel granulates include a first type of aerogel granulates having a first volume and a second type of aerogel granulates having a second volume, the first volume being at least ten times larger than the second volume.

17. A method of producing a beverage distribution python for extending between a beverage storage area and a beverage tapping area in a beverage dispensing assembly, the method comprising:

providing a liquid carrying line defining a center line and comprising at least one of a beverage tube and a beverage guide tube;

providing a pipe covering the liquid carrying line in a coaxial relationship to the center line and establishing a space between the pipe and the liquid carrying line;

establishing a gel within the space between the pipe and the liquid carrying line by introducing an aerogel precursor material and a solvent liquid into the space between the pipe and the liquid carrying line; and supercritically drying the gel by increasing the temperature and pressure of the gel, allowing the gel to form a supercritical fluid within the pipe, and reducing the temperature and pressure of the gel, thereby forming a solid insulating layer of aerogel within the space between the pipe and the liquid carrying line, and encircling the liquid carrying line, the insulating layer comprising at least 80% aerogel by volume.

18. A method of producing a beverage distribution python for extending between a beverage storage area and a beverage tapping area in a beverage dispensing assembly, the method comprising:

providing a liquid carrying line defining a center line and comprising at least one of a beverage tube and a beverage guide tube;

wrapping a first insulation layer around the liquid carrying line to overlap itself;

wrapping a second insulation layer around the first insulation layer to overlap itself, the first and second insulating layers being flexible and comprising at least 80% aerogel by volume; and covering the second insulating layer by a pipe in a coaxial relationship to the center line.

* * * * *

UNITED STATES PATENT AND TRADEMARK OFFICE
CERTIFICATE OF CORRECTION

PATENT NO. : 9,638,473 B2
APPLICATION NO. : 14/649182
DATED : May 2, 2017
INVENTOR(S) : Jan Norager Rasmussen et al.

It is certified that error appears in the above-identified patent and that said Letters Patent is hereby corrected as shown below:

In Column 1, Lines 63-67, delete "Since the applicant company Carlsberg Breweries A/S alone has installed over 100.000 beverage dispensing pythons, the total electrical wattage used by those pythons only will amount to 20 MW electrical power, corresponding to about 2% of a typical major power plant." and insert the same on Column 1, Line 62, as a continuation of paragraph.

In Column 4, Line 8, delete "excapsulated" and insert -- encapsulated --, therefor.

In Column 4, Line 30, delete "reflexted" and insert -- reflected --, therefor.

In Column 4, Line 56, delete "silan" and insert -- silane --, therefor.

In Column 5, Line 51, delete "silikoxide" and insert -- siliconoxide --, therefor.

In Column 6, Line 2, delete "ZrOC12.5H2O" and insert -- ZrOCl2.5H2O --, therefor.

In Column 6, Line 16, delete "azetropic" and insert -- azeotropic --, therefor.

In Column 6, Line 19, delete "etanol:" and insert -- ethanol: --, therefor.

In Column 6, Lines 23-24, delete "Chloralhydrate." and insert -- chloralhydrate. --, therefor.

In Column 6, Line 28, delete "(triethoxysily)propyl)" and insert -- (triethoxysilyl)propyl) --, therefor.

In Column 9, Line 56, delete "silikoxide" and insert -- siliconoxide --, therefor.

In Column 10, Line 8, delete "FIG." and insert -- FIGS. --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,638,473 B2

In Column 10, Line 9, after "aerogel" insert -- . --.

In Column 10, Line 10, delete "FIG." and insert -- FIGS. --, therefor.